US012807317B2

(12) United States Patent
Weaver et al.

(10) Patent No.: US 12,807,317 B2
(45) Date of Patent: Nov. 24, 2026

(54) EXHAUST DUCT MOUNTING STRUCTURE FOR HYBRID AIRCRAFT POWERPLANT

(71) Applicant: Pratt & Whitney Canada Corp., Longueuil (CA)

(72) Inventors: Paul Weaver, Chateauguay (CA); Bruno Chatelois, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/582,136

(22) Filed: Feb. 20, 2024

(65) Prior Publication Data

US 2025/0263173 A1 Aug. 21, 2025

(51) Int. Cl.
*B64D 27/33* (2024.01)
*B64D 27/40* (2024.01)

(52) U.S. Cl.
CPC ............. *B64D 27/33* (2024.01); *B64D 27/40* (2024.01); *F05D 2220/76* (2013.01)

(58) Field of Classification Search
CPC ........ B64D 27/33; B64D 27/40; B64D 33/04; F05D 2220/76
See application file for complete search history.

(56) References Cited

U.S. PATENT DOCUMENTS 3,393,518 A * 7/1968 Bridge ...................... F02K 1/40 60/770
4,290,262 A * 9/1981 Wynosky ................ F02K 1/825 60/262
5,699,662 A * 12/1997 Born ...................... B64D 33/04 60/770
7,584,621 B2 * 9/2009 Spitzer .................... F01D 25/30 60/39.5
8,317,129 B1 11/2012 Lawson
9,003,811 B2 4/2015 Barnett
10,267,263 B2 4/2019 Lord
11,641,144 B2 5/2023 Paziński
11,746,671 B2 9/2023 Grunwald
2018/0051627 A1 2/2018 Chandler
2019/0085715 A1 3/2019 Van Der Merwe
(Continued)

OTHER PUBLICATIONS

EP Search Report for EP Patent Application No. 25159189.7 dated Jun. 2, 2025.

*Primary Examiner* — Ted Kim
(74) *Attorney, Agent, or Firm* — Getz Balich LLC

(57) ABSTRACT

An assembly is provided for an aircraft propulsion system. This assembly includes an electric machine, an exhaust duct and a mounting structure. The electric machine extends axially along an axis. The exhaust duct includes an annular first section and a non-annular second section fluidly coupled with and downstream of the annular first section. The annular first section extends circumferentially around the axis. The non-annular second section axially overlaps the electric machine and extends partially circumferentially about the electric machine. The mounting structure connects the electric machine to the exhaust duct. The mounting structure includes a duct mount, a machine mount and a framework. The duct mount is connected to the annular first section. The machine mount is connected to the electric machine. The framework extends axially between and is connected to the duct mount and the machine mount. The framework includes a plurality of struts arranged in a truss.

18 Claims, 10 Drawing Sheets

(56) References Cited

U.S. PATENT DOCUMENTS

| | | | | |
|---|---|---|---|---|
| 2020/0063606 | A1 | 2/2020 | Miller | |
| 2021/0010382 | A1 | 1/2021 | Davies | |
| 2021/0010383 | A1 | 1/2021 | Bradley | |
| 2021/0010384 | A1 | 1/2021 | Bradley | |
| 2021/0079850 | A1 | 3/2021 | Davies | |
| 2021/0281145 | A1 | 9/2021 | Lemmers, Jr. | |
| 2022/0205391 | A1 | 6/2022 | Anderson | |
| 2022/0268205 | A1* | 8/2022 | Seki | H02K 7/085 |
| 2024/0208664 | A1* | 6/2024 | Menheere | B64D 27/10 |
| 2025/0256854 | A1* | 8/2025 | Bohm | B64D 27/357 |

* cited by examiner

EXHAUST DUCT MOUNTING STRUCTURE FOR HYBRID AIRCRAFT POWERPLANT

TECHNICAL FIELD

This disclosure relates generally to an aircraft and, more particularly, to a hybrid powerplant for the aircraft.

BACKGROUND INFORMATION

A hybrid powerplant for an aircraft may include a gas turbine engine and an electric motor. The gas turbine engine and the electric motor may be operatively connected in parallel through a gearbox or inline through a shaft and/or another coupling. Various types and configurations of hybrid powerplants are known in the art. While these known hybrid powerplants have various benefits, there is still room in the art for improvement.

SUMMARY

According to an aspect of the present disclosure, an assembly is provided for an aircraft propulsion system. This assembly includes an electric machine, an exhaust duct and a mounting structure. The electric machine extends axially along an axis. The exhaust duct includes an annular first section and a non-annular second section fluidly coupled with and downstream of the annular first section. The annular first section extends circumferentially around the axis. The non-annular second section axially overlaps the electric machine and extends partially circumferentially about the electric machine. The mounting structure connects the electric machine to the exhaust duct. The mounting structure includes a duct mount, a machine mount and a framework. The duct mount is connected to the annular first section. The machine mount is connected to the electric machine. The framework extends axially between and is connected to the duct mount and the machine mount. The framework includes a plurality of struts arranged in a truss.

According to another aspect of the present disclosure, another assembly is provided for an aircraft propulsion system. This assembly includes a gas turbine engine, an electric machine, a duct mount, a machine mount and a framework. The gas turbine engine includes a rotating assembly and an engine case housing the rotating assembly. The rotating assembly is rotatable about an axis. The electric machine includes a machine rotor and a machine case housing the machine rotor. The machine rotor is operatively coupled to the rotating assembly rotatable by a drivetrain. The duct mount is connected to the engine case and circumscribes the drivetrain. The machine mount is connected to the machine case and circumscribes the drivetrain. The framework extends axially between and is connected to the duct mount and the machine mount. The framework includes a plurality of struts arranged in a truss.

According to still another aspect of the present disclosure, another assembly is provided for an aircraft propulsion system. This assembly includes an electric machine, an exhaust duct and a mounting structure. The electric machine extends axially along an axis. The exhaust duct includes an annular first section and a non-annular second section fluidly coupled with and downstream of the annular first section. The annular first section circumscribes the axis. The non-annular second section axially overlaps the electric machine and wraps partially circumferentially about the electric machine. The mounting structure connects the electric machine to the exhaust duct. The mounting structure includes a plurality of struts arranged in a truss. An outer portion of the truss wraps partially circumferentially about the annular first section. An inner portion of the truss projects radially into a pocket in the non-annular second section towards the electric machine.

The gas turbine engine may also include an exhaust duct with a pocket. The truss may wrap partially circumferentially around the exhaust duct and project radially into the pocket.

The duct mount may include an annular mounting flange that extends circumferentially around the axis.

The duct mount may include a plurality of mounting flanges arranged circumferentially about the axis.

The exhaust duct may be bonded to the duct mount.

The exhaust duct may be mechanically fastened to the duct mount.

The machine mount may extend circumferentially around and may be mechanically fastened to the electric machine.

The machine mount may include a mounting ring and a triangular frame. The mounting ring may be connected to the electric machine. The triangular frame may project out from the mounting ring and may be connected to the framework.

The machine mount may include a mounting ring, a first arm and a second arm.

The mounting ring may be connected to the electric machine. The first arm may project out from the mounting ring and may be connected to a first set of the struts at a first node. The second arm may project out from the mounting ring and may be connected to a second set of the struts at a second node.

The exhaust duct may extend partially circumferentially about the mounting ring between a first circumferential side and a second circumferential side. The first arm may radially overlap the first circumferential side. The first node may be disposed radially outboard of the exhaust duct. The second arm may radially overlap the second circumferential side. The second node may be disposed radially outboard of the exhaust duct.

The machine mount may also include a third arm circumferentially between the first arm and the second arm. The third arm may project out from the mounting ring and may be connected to a third set of the struts at a third node.

A fourth set of the struts may be connected to the mounting ring at a fourth node that is diametrically opposite the third node.

A third set of the strut may be connected to the mounting ring circumferentially between and equispaced from the first node and the second node.

The struts may include a first strut, a second strut and a third strut. The first strut and the second strut may be connected to the duct mount at a first duct mount node. The second strut and the third strut may be connected to the machine mount at a first machine mount node. The third strut may be connected to the duct mount at a second duct mount node.

The struts may also include a fourth strut. The fourth strut may be connected to the second strut at a location between the first duct mount node and the second duct mount node. The fourth strut may be connected to the machine mount at a second machine mount node.

The struts may also include a fourth strut. The fourth strut may be connected to the second strut at a location between the first duct mount node and the second duct mount node. The fourth strut may be connected to the duct mount at a third duct mount node.

The assembly may also include a gas turbine engine and a drivetrain. The gas turbine engine may include the exhaust duct, an engine case and a rotating assembly. The engine case may house the rotating assembly. The electric machine may be mounted to the engine case through the mounting structure. The drivetrain may project through a bore of the annular first section and may operably couple a rotor in the electric machine to the rotating assembly.

The electric machine may be configurable an electric motor and/or an electric generator.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
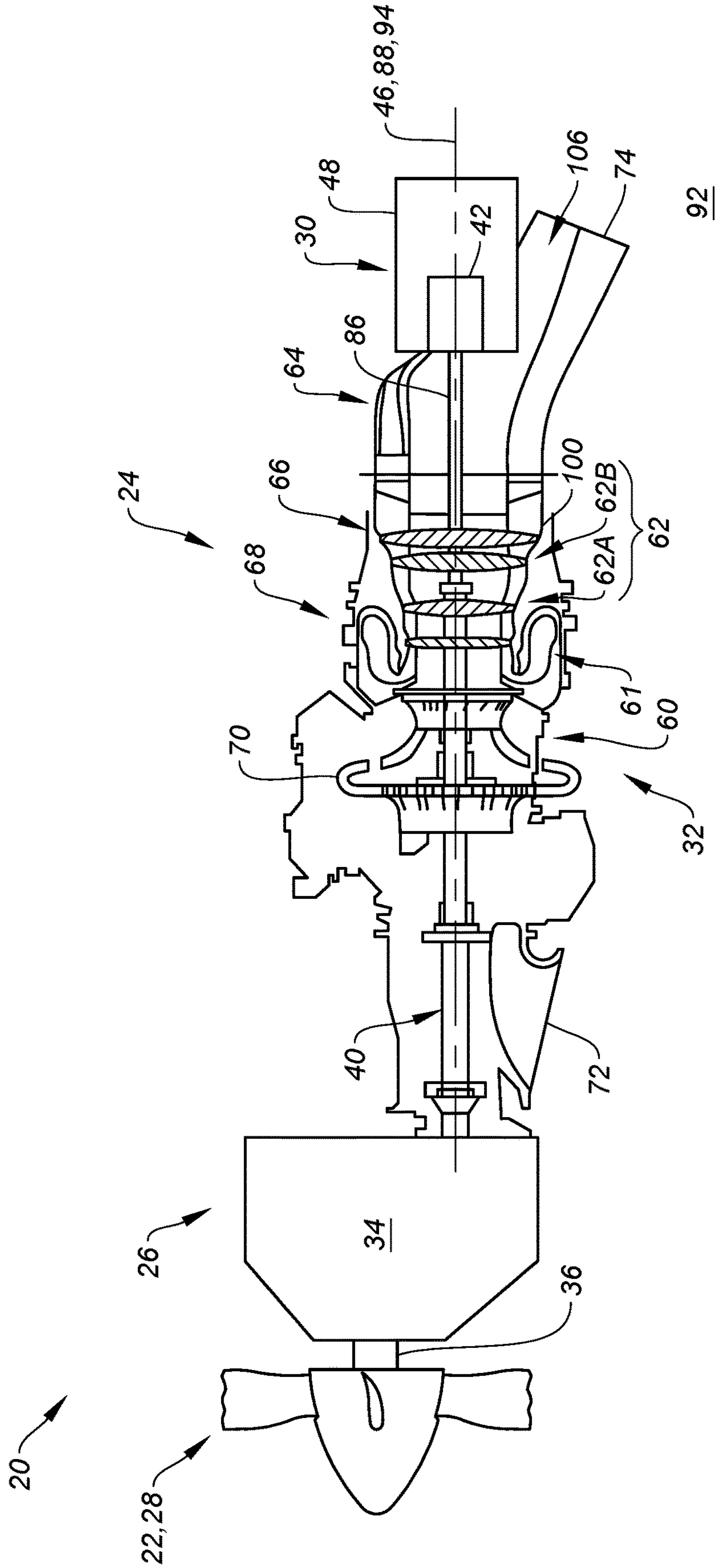
FIG. 1 is a partial schematic sectional illustration of an aircraft system.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 may be configured as or otherwise include a propulsion system for the aircraft. The aircraft system 20 of FIG. 1, for example, includes a propulsor rotor 22 and a hybrid powerplant 24. The aircraft system 20 of FIG. 1 also includes a drivetrain 26 operatively connecting the powerplant 24 to the propulsor rotor 22.

The propulsor rotor 22 may be configured as or otherwise include a bladed rotor. This propulsor rotor 22 may be an open rotor (e.g., an un-ducted rotor) such as a propeller rotor 28 for a propeller propulsion system; e.g., a hybrid turboprop engine. Other examples of the open rotor include a propulsor rotor for a propfan propulsion system or a propulsor rotor for a pusher fan propulsion system. The present disclosure, however, is not limited to such exemplary open rotors nor to open rotor propulsion systems. The propulsor rotor 22, for example, may alternatively be a ducted rotor such as a fan rotor (e.g., a fan) for a turbofan propulsion system; e.g., a hybrid turbofan engine. It is further contemplated the propulsor rotor 22 may be configured as another type of air mover. However, for ease of description, the propulsor rotor 22 may be described and/or referred to herein as the propeller rotor 28 for the propeller propulsion system.

The powerplant 24 includes an electric machine 30 and a gas turbine engine 32. The powerplant 24 is configured to drive rotation of the propulsor rotor 22, using the electric machine 30 and/or the gas turbine engine 32, through the drivetrain 26. This drivetrain 26 may be configured as a geared drivetrain. The drivetrain 26 of FIG. 1, for example, includes a geartrain 34 (e.g., a reduction gear system) and a shaft 36 and/or another power transmission device coupling an output of the geartrain 34 to the propulsor rotor 22. The present disclosure, however, is not limited to such an exemplary geared drivetrain arrangement. Furthermore, in other embodiments, the geartrain 34 may be omitted from the drivetrain 26 to provide a direct drive drivetrain between the powerplant 24 and the propulsor rotor 22.

Figure 2:
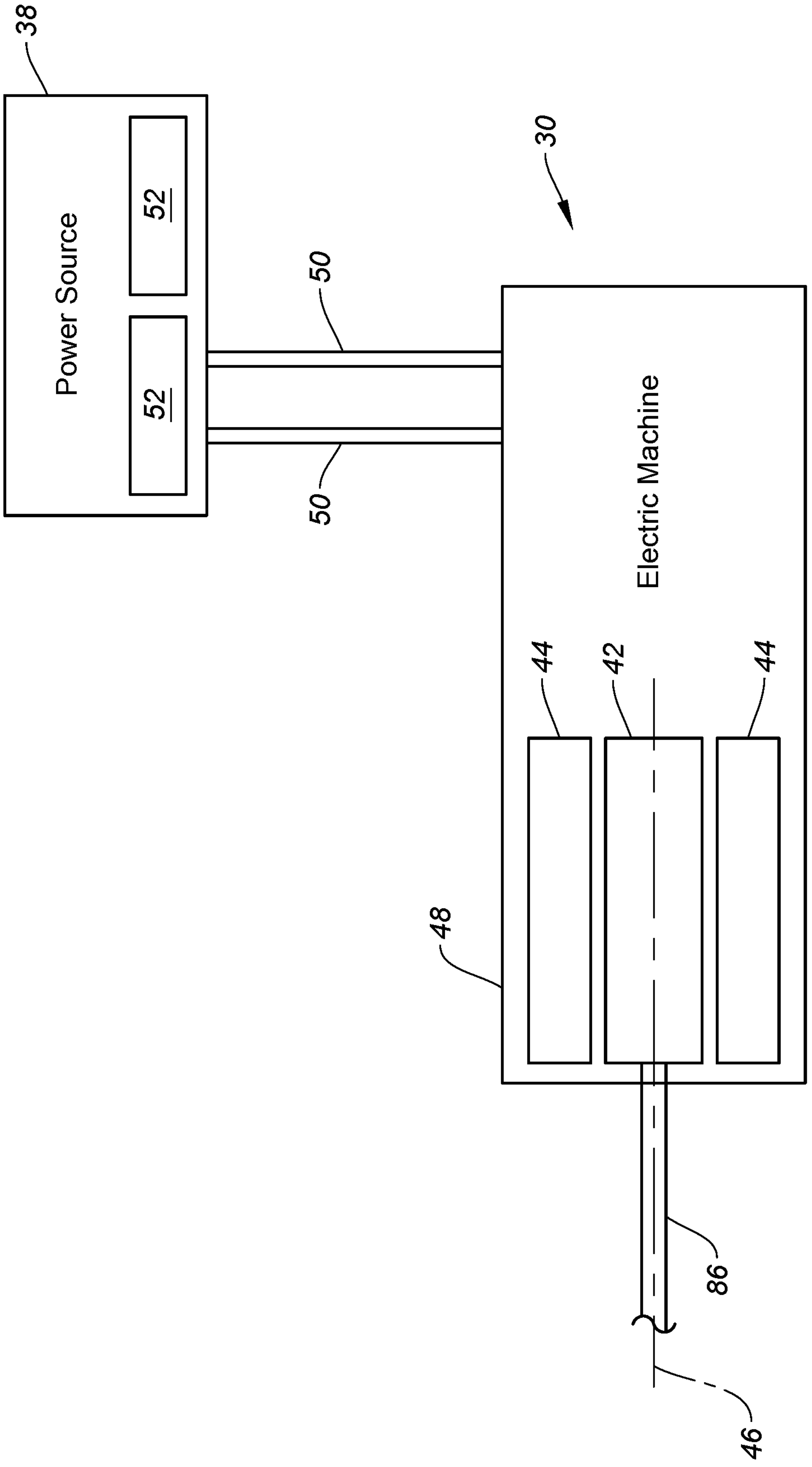
FIG. 2 is a schematic illustration of an electric machine arranged with a power source.

Referring to FIG. 2, the electric machine 30 may be configurable as an electric motor and/or an electric generator; e.g., a motor-generator. For example, during a motor mode of operation, the electric machine 30 may operate as the electric motor to convert electricity received from a power source 38 into mechanical power. This mechanical power may be utilized for various purposes within the aircraft system 20 of FIG. 1 such as, for example, rotating the propulsor rotor 22 and/or rotating a low speed rotating structure 40 (or another rotating structure) within the gas turbine engine 32 during engine startup. During a generator mode of operation, the electric machine 30 may operate as the electric generator to convert mechanical power received from, for example, the gas turbine engine 32 and its low speed rotating structure 40 into electricity. This electricity may be utilized for various purposes within the aircraft system 20 such as, for example, electrically powering one or more electric components of the aircraft system 20 and/or charging the power source 38 (see FIG. 2). The electricity may also or alternatively be utilized for various purposes outside of the aircraft system 20 such as, for example, electrically powering one or more electric components in the aircraft. Of course, in other embodiments, the electric machine 30 may alternatively be configured as a dedicated electric motor (e.g., without the electric generator functionality) or a dedicated electric generator (e.g., without the electric motor functionality).

The electric machine 30 of FIG. 2 includes an electric machine rotor 42 and an (e.g., annular) electric machine stator 44. The machine stator 44 may be radially outboard of and circumscribe the machine rotor 42. The electric machine 30, however, is not limited to such an exemplary rotor-stator configuration. The machine rotor 42, for example, may alternatively be axially next to or radially outboard of and circumscribe the machine stator 44. The machine rotor 42 of FIG. 2 is rotatable about a rotational axis 46 of the machine rotor 42, which rotational axis 46 may also be an axial centerline of the electric machine 30. The electric machine 30 also includes an electric machine case 48 that at least partially or completely houses the machine rotor 42 and the machine stator 44.

The power source 38 is electrically coupled with the electric machine 30 through one or more electrical leads 50; e.g., high voltage lines. The power source 38 is configured to store electricity. The power source 38 is also configured to provide the stored electricity to the electric machine 30 and/or receive electricity from the electric machine 30; e.g., during power source recharging. The power source 38, for example, may be configured as or otherwise include one or more batteries 52 and/or one or more other electric storage devices.

Figure 3:
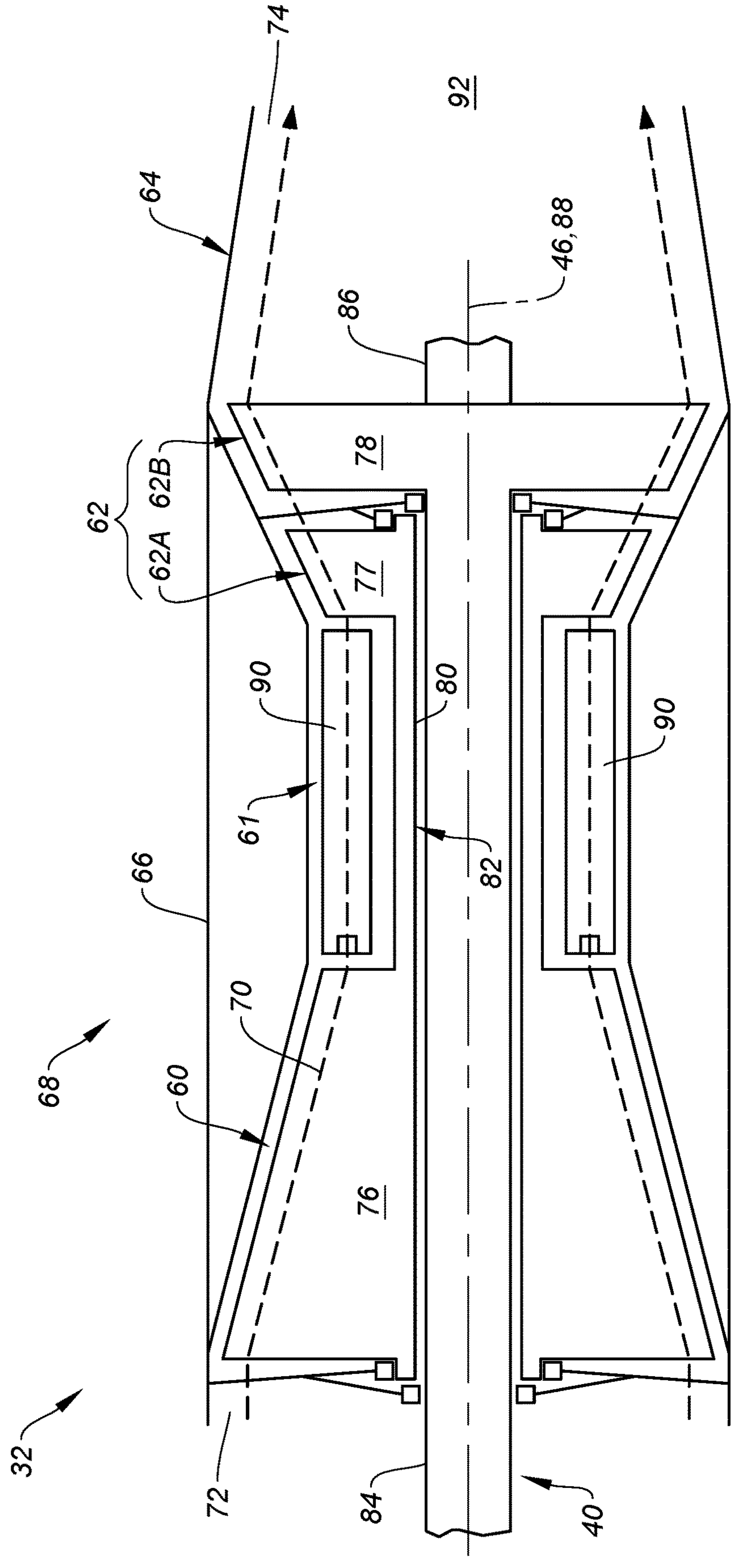
FIG. 3 is a schematic illustration of a gas turbine engine.

Referring to FIG. 3, the gas turbine engine 32 includes a compressor section 60, a combustor section 61, a turbine section 62 and an (e.g., axisymmetric) exhaust duct 64. The turbine section 62 may include a high pressure turbine (HPT) section 62A and a low pressure turbine (LPT) section 62B; e.g., a power turbine section. The gas turbine engine 32 also includes an engine case 66 housing the engine sections 60-62B; e.g., a core 68 of the gas turbine engine 32.

The compressor section 60, the combustor section 61, the HPT section 62A, the LPT section 62B and the exhaust duct 64 are arranged sequentially along a core flowpath 70 within the gas turbine engine 32. This flowpath 70 extends within the gas turbine engine 32 from an upstream airflow inlet 72 into the gas turbine engine 32 to a downstream combustion products exhaust 74 from the gas turbine engine 32.

Each of the engine sections 60, 62A and 62B includes a respective bladed rotor 76-78. Each of these bladed rotors 76-78 includes a plurality of rotor blades arranged circumferentially around and connected to one or more respective rotor disks. The rotor blades, for example, may be formed integral with or mechanically fastened, welded, brazed and/or otherwise attached to the respective rotor disk(s). The compressor rotor 76 is connected to the HPT rotor 77 through a high speed shaft 80. At least (or only) the compressor rotor 76, the HPT rotor 77 and the high speed shaft 80 may collectively form a high speed rotating structure 82 of the gas turbine engine 32. The LPT rotor 78 is connected to a low speed shaft 84, which low speed shaft 84 may extend axially through a bore of the high speed rotating structure 82 and its high speed shaft 80. At least (or only) the LPT rotor 78 and the low speed shaft 84 may collectively form the low speed rotating structure 40. This low speed rotating structure 40 may be coupled to and rotatable with the propulsor rotor 22 of FIG. 1 through the drivetrain 26 and its member(s) 34 and/or 36. The low speed rotating structure 40 of FIG. 1 may also be coupled to and rotatable with the machine rotor 42 through an electric machine drivetrain 86; e.g., a power coupling shaft and/or another power transmission device. With such an arrangement, the machine rotor 42 of FIG. 1 is coupled to the propulsor rotor 22 through the low speed rotating structure 40, and more particularly sequentially through the drivetrain 86, the low speed rotating structure 40 and the drivetrain 26 of FIG. 1. The present disclosure, however, is not limited to such an exemplary operative connection between the electric machine 30 and the propulsor rotor 22.

The rotating structures 82 and 40 and their shafts 80 and 84 of FIG. 3 are supported by a plurality of bearings. Each of these bearings is connected to the engine case 66 by one or more support structures; e.g., struts, frames, etc. With this arrangement, each of the rotating structures 82 and 40 of FIG. 3 is rotatable about a common (or respective) rotational axis 88, which rotational axis 88 may also be an axial centerline of the respective rotating structure 82, 40. In some embodiments, referring to FIG. 1, the rotational axis 88 may be coaxial with or at least substantially parallel with (e.g., within +/−2° or 5° of) the rotational axis 46 of the machine rotor 42. The electric machine 30 of FIG. 1 may thereby be (e.g., completely or substantially) radially aligned with, but aft and/or downstream of the engine core 68. Here, the exhaust duct 64 is aft and/or downstream of the engine core 68.

Referring again to FIG. 3, during gas turbine engine operation, air enters the flowpath 70 through the airflow inlet 72 and is directed into the compressor section 60. The air within the flowpath 70 may be referred to as "core air". This core air is compressed by the compressor rotor 76 and directed into a combustion chamber 90 (e.g., an annular chamber) of a combustor within the combustor section 61. The fuel is injected into the combustion chamber 90 by one or more fuel injectors and mixed with the compressed air to provide a fuel-air mixture. This fuel-air mixture is ignited and combustion products thereof flow through and sequentially drive rotation of the HPT rotor 77 and the LPT rotor 78. The rotation of the HPT rotor 77 drives rotation of the compressor rotor 76 and, thus, compression of the air received from the airflow inlet 72. The rotation of the LPT rotor 78 and, more generally, the low speed rotating structure 40 provides mechanical power for driving (e.g., rotating) the propulsor rotor 22 of FIG. 1. The present disclosure, however, is not limited to such an exemplary gas turbine engine configuration. For example, in other embodiments, the low speed rotating structure 40 may also include a compressor rotor. In still other embodiments, the low speed rotating structure 40 may be omitted and the high speed rotating structure 82 may be configured for providing the mechanical power for driving the propulsor rotor 22 of FIG. 1. In such embodiments, the electric machine 30 and its machine rotor 42 may be coupled to the propulsor rotor 22 through the high speed rotating structure 82. Referring again to FIG. 3, after flowing through the turbine section 62, the combustion products flow through the exhaust duct 64 and are exhausted from the powerplant 24 through the combustion products exhaust 74 into an environment 92 external to the aircraft system 20; see also FIG. 1.

Figure 4:
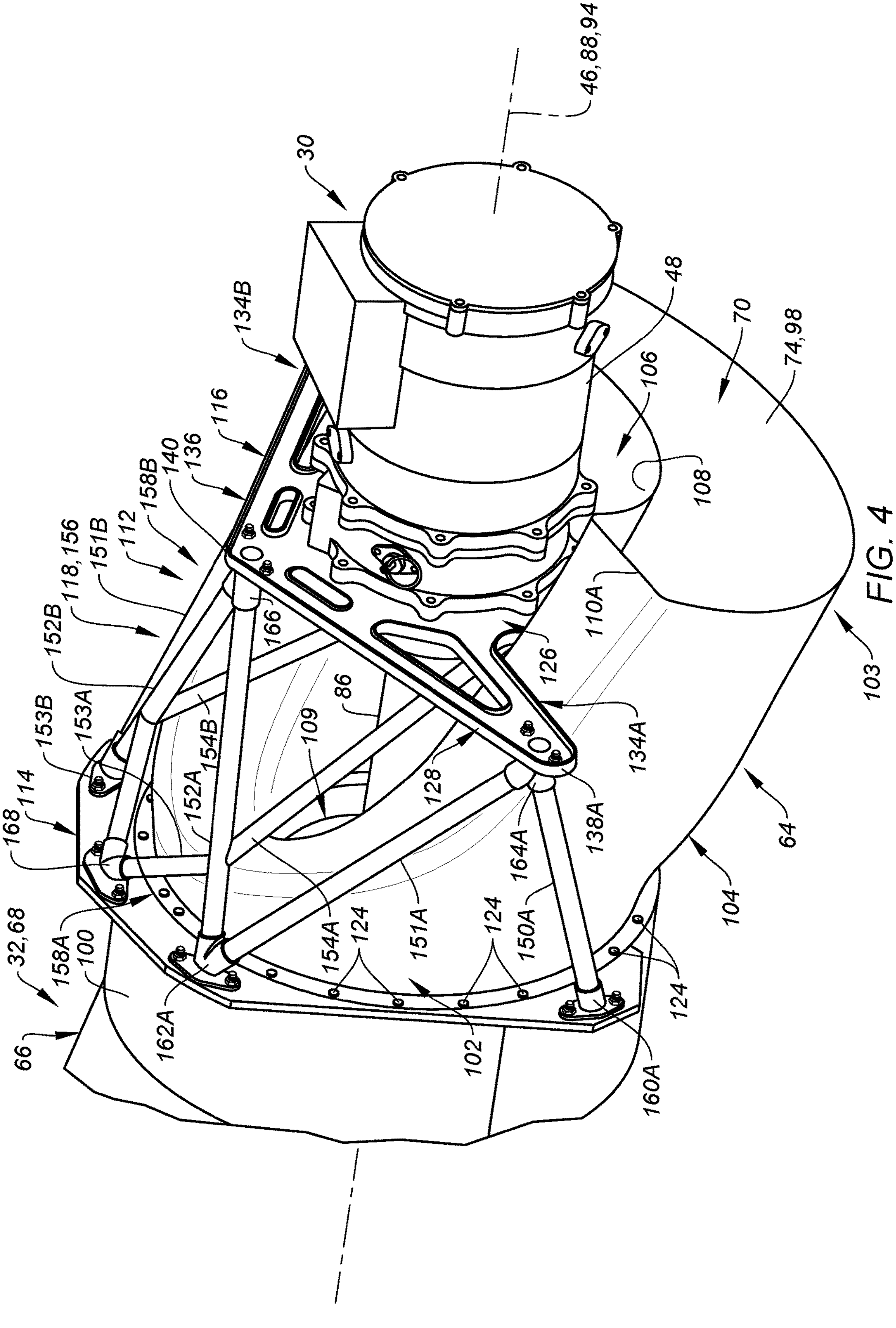
FIG. 4 is a perspective illustration of a portion of a powerplant at the electric machine and an exhaust duct of the gas turbine engine.
Figure 5:
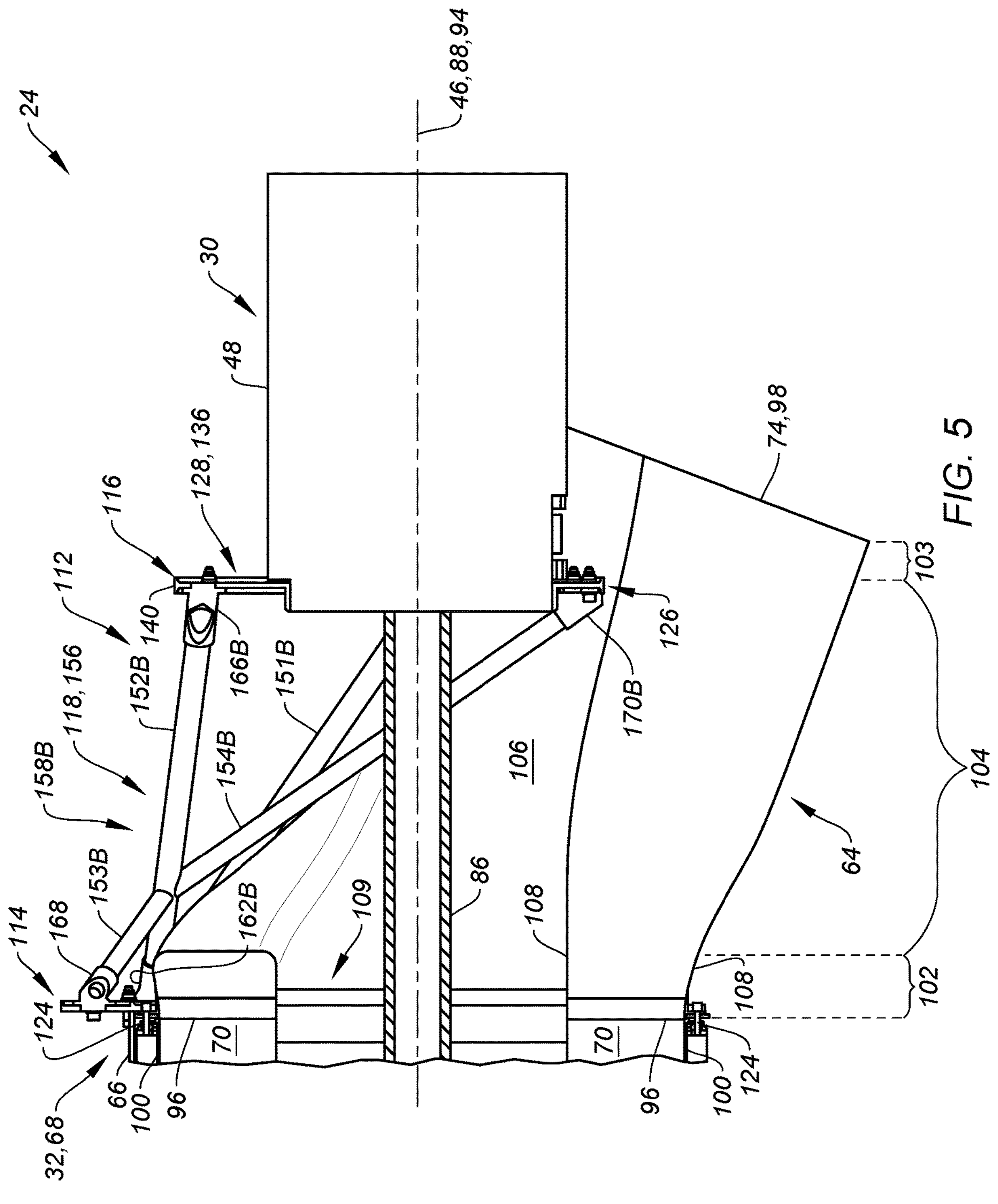
FIG. 5 is a sectional illustration of a portion of the powerplant at the electric machine (schematically shown) and the exhaust duct.

Referring to FIGS. 4 and 5, the exhaust duct 64 is located at an aft and/or downstream end of the gas turbine engine 32. The exhaust duct 64 of FIGS. 4 and 5, for example, extends longitudinally along a longitudinal centerline 94 between and to an inlet 96 to the exhaust duct 64 (see FIG. 5) and an outlet 98 from the exhaust duct 64, which longitudinal centerline 94 may be coaxial with one or more of the rotational axes 46, 88; see also FIG. 1. The exhaust duct 64 is connected to the engine case 66. The exhaust duct 64 of FIG. 5, for example, is mechanically fastened to an aft and/or downstream portion 100 of the engine case 66 housing the turbine section 62 at the duct inlet 96. The duct outlet 98 forms the combustion products exhaust 74. The exhaust duct 64 thereby projects longitudinally out from the turbine section portion 100 of the engine case 66 to the combustion products exhaust 74. The exhaust duct 64 includes an annular inlet section 102, a non-annular outlet section 103 and a transition section 104.

Figure 6:
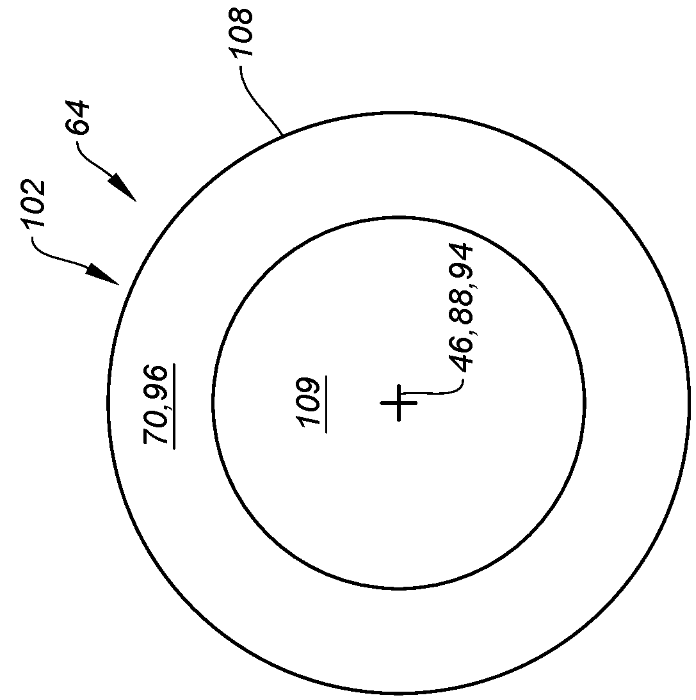
FIG. 6 is a cross-sectional illustration of an inlet section of the exhaust duct.

Referring to FIG. 5, the inlet section 102 forms the duct inlet 96. The inlet section 102 of FIG. 5 is disposed longitudinally between (a) the turbine section 62/the engine case 66 and (b) the electric machine 30 along the longitudinal centerline 94. Referring to FIG. 6, the inlet section 102 has an annular cross-sectional geometry ("annular geometry") when viewed, for example, in a reference plane perpendicular to the longitudinal centerline 94 and/or the flowpath 70 at a point of interest along the inlet section 102. The annular geometry of FIG. 6 has a circular shape. This annular geometry may be uniform along a longitudinal length of the inlet section 102. Alternatively, the annular geometry may (e.g., slightly) change along at least a portion of the longitudinal length of the inlet section 102. The present disclosure, however, is not limited to such an exemplary annular shape.

Figure 7:
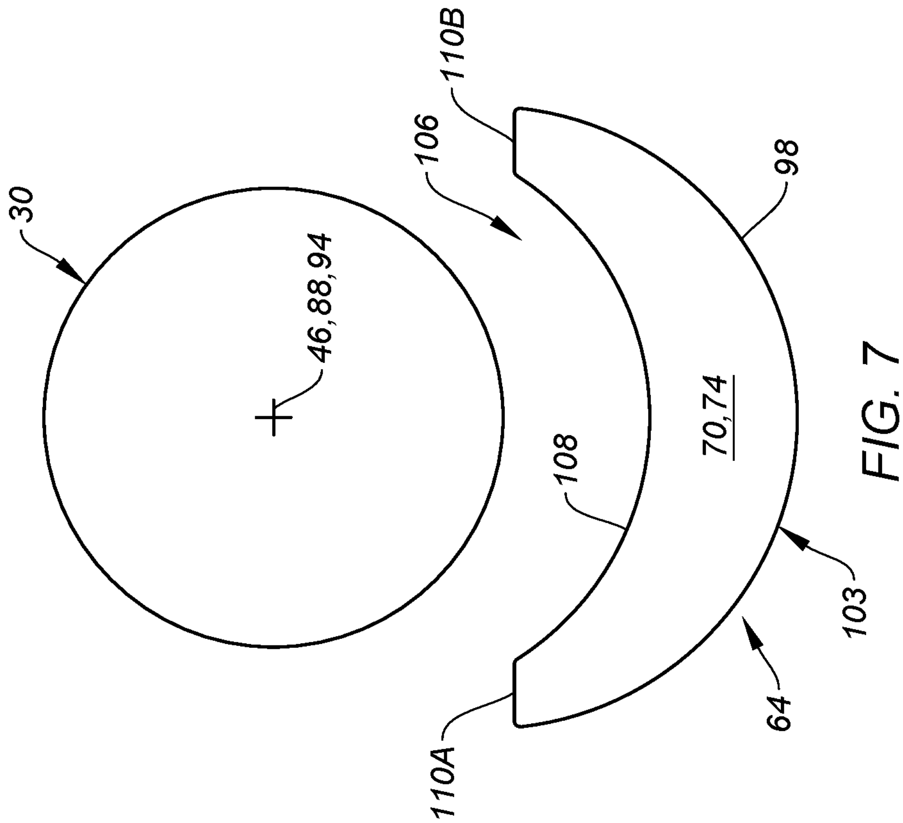
FIG. 7 is a cross-sectional illustration of an outlet section of the exhaust duct with the electric machine (schematically shown).

Referring to FIG. 5, the outlet section 103 forms the duct outlet 98 and the combustion products exhaust 74. The outlet section 103 longitudinally overlaps the electric machine 30 along the longitudinal centerline 94. The outlet section 103 of FIG. 5, for example, extends longitudinally along the electric machine 30 to the combustion products exhaust 74. Referring to FIG. 7, the outlet section 103 has a non-annular cross-sectional geometry ("non-annular geometry") when viewed, for example, in a reference plane perpendicular to the longitudinal centerline 94 and/or the flowpath 70 at a point of interest along the outlet section 103. The non-annular geometry of FIG. 7 is an arcuate geometry with, for example, a U-shape or a crescent shape. This non-annular geometry may be uniform along a longitudinal length of the outlet section 103. Alternatively, the non-annular geometry may (e.g., slightly) change along at least a portion of the longitudinal length of the outlet section 103. The present disclosure, however, is not limited to such an exemplary non-annular geometry. For example, in other embodiments, the non-annular geometry of the outlet section 103 may have a circular segment shape or a polygonal shape.

Referring to FIGS. 4 and 5, the transition section 104 connects the outlet section 103 to the inlet section 102. The transition section 104 of FIGS. 4 and 5, for example, extends longitudinally between and to the inlet section 102 and the outlet section 103. The transition section 104 may (or may not) longitudinally overlap the electric machine 30 along the longitudinal centerline 94. An aft and/or downstream portion of the transition section 104 of FIG. 5, for example, extends longitudinally along the electric machine 30 to the outlet section 103. A forward and/or upstream portion of the transition section 104 of FIG. 5, on the other hand, may be disposed longitudinally between (a) the inlet section 102 and (b) the electric machine 30 along the longitudinal centerline 94. The transition section 104 has a non-annular cross-sectional geometry ("non-annular geometry") when viewed, for example, in a reference plane perpendicular to the longitudinal centerline 94 and/or the flowpath 70 at a point of interest along the transition section 104. The non-annular geometry is an arcuate geometry; see also FIG. 4. This non-annular geometry of the transition section 104 changes along at least a portion or an entirety of a longitudinal length of the transition section 104 to provide a (e.g., gradual) transition between the annular geometry of the inlet section 102 and the non-annular geometry of the outlet section 103.

The exhaust sections 103 and 104 of FIGS. 4 and 5 are configured to provide the exhaust duct 64 with a side pocket 106; e.g., a groove, an indentation, a recession, a channel, etc. This side pocket 106 is outside of the flowpath 70 and, more particularly, separated from the flowpath 70 by an exterior sidewall 108 of the exhaust duct 64. The side pocket 106 is thereby disposed next to the exhaust duct 64 and its sidewall 108. The side pocket 106 of FIGS. 4 and 5, for example, extends longitudinally into the exhaust duct 64 from an end at the duct outlet 98 to the inlet section 102 and its internal bore 109; see also FIG. 6. The side pocket 106 projects radially into (in a radial outward direction relative to the longitudinal centerline 94) the exhaust duct 64 and its exhaust sections 103 and 104. The side pocket 106 extends laterally within the exhaust duct 64 and its exhaust sections 103 and 104.

The electric machine 30 may be arranged at least partially within the side pocket 106. One or more of the duct sections 103 and/or 104 may each extend axially along (e.g., overlap) the electric machine 30. One or more of the duct sections 103 and/or 104 may each extend (e.g., wrap) circumferentially about the electric machine 30 (and the longitudinal centerline 94) between opposing circumferential sides 110A and 110B (generally referred to as "110") of the exhaust duct 64; see FIG. 7. With this arrangement, the electric machine 30 may be aligned with the gas turbine engine 32; e.g., the rotational axes 46, 88 may be at least substantially coaxial. The electric machine 30 may also project (e.g., vertically and/or laterally) out of the side pocket 106 and away from the exhaust duct 64 such that at least a portion of an exterior of the electric machine 30 and its machine case 48 is exposed to air (e.g., relatively cool air, ambient air, etc.) outside of and away from the exhaust duct 64. Such an arrangement may (e.g., significantly) reduce cooling requirements for the electric machine 30. Insulation may also (or may not) be provided along an exterior surface of the exhaust duct 64 and its sidewall 108 within the side pocket 106 to provide further heat protection for the electric machine 30.

The electric machine 30 of FIGS. 4 and 5 is mounted to the gas turbine engine 32 and its engine case 66 and/or its exhaust duct 64 through a mounting structure 112. This mounting structure 112 is configured to fixedly locate the electric machine 30 relative to the gas turbine engine 32. The mounting structure 112 is also configured to facilitate airflow to and around the electric machine 30 and/or access to the electric machine 30 and/or the drivetrain 86 during aircraft system assembly. The mounting structure 112 of FIGS. 4 and 5, for example, includes a duct mount 114, a machine mount 116 and an open framework 118.

Figure 8:
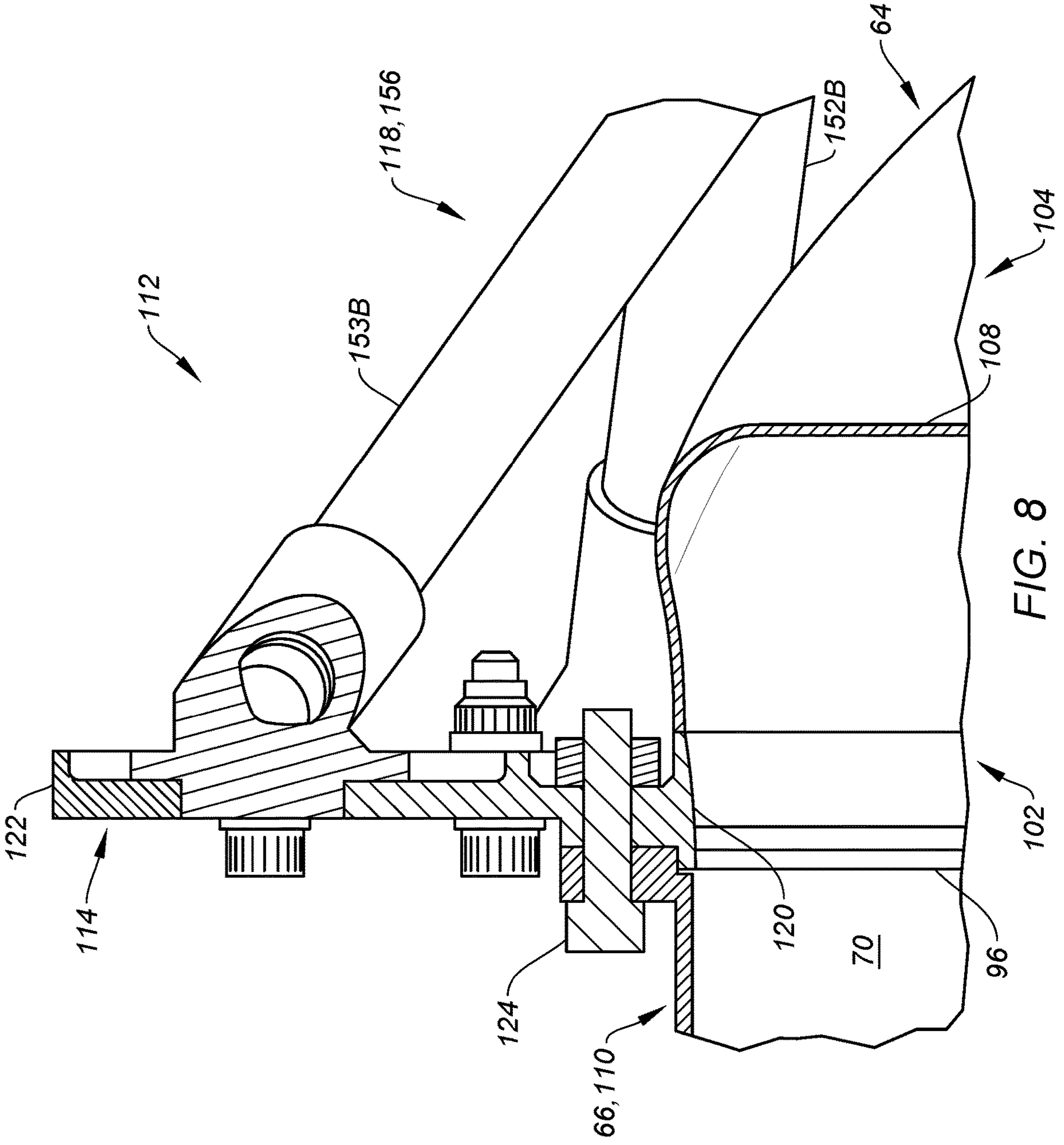
FIG. 8 is a sectional illustration of a bolted connection between an engine case, the exhaust duct and an electric machine mounting structure.

Referring to FIG. 4, the duct mount 114 may be configured as or otherwise include an annular mounting flange. The duct mount 114 of FIG. 4, for example, extends circumferentially around the longitudinal centerline 94/the axes 46, 88 providing the duct mount 114 with a full-hoop body. Referring to FIG. 8, the duct mount 114 extends radially from a radial inner end 120 of the duct mount 114 to a radial outer end 122 of the duct mount 114. This duct mount 114 may be connected to the exhaust duct 64 and/or the engine case 66. The sidewall 108 of the exhaust duct 64 of FIG. 8, for example, is abutted axially against the duct mount 114 at its duct mount inner end 120. The exhaust duct 64 and its sidewall 108 of FIG. 8 are also bonded (e.g., welded) to the duct mount 114. The engine case 66 of FIG. 8 may also be abutted axially against or otherwise engaged with the duct mount 114. Here, the duct mount 114 is positioned axially between the engine case 66 and the exhaust duct 64. The engine case 66 of FIG. 8 is also mechanically fastened to the duct mount 114 with a plurality of fasteners 124 (e.g., bolts) at a bolted flange connection. The duct mount 114 may thereby connect the exhaust duct 64 to the engine case 66 as well as connect the mounting structure 112 to each of the elements 64 and 66.

Figure 9:
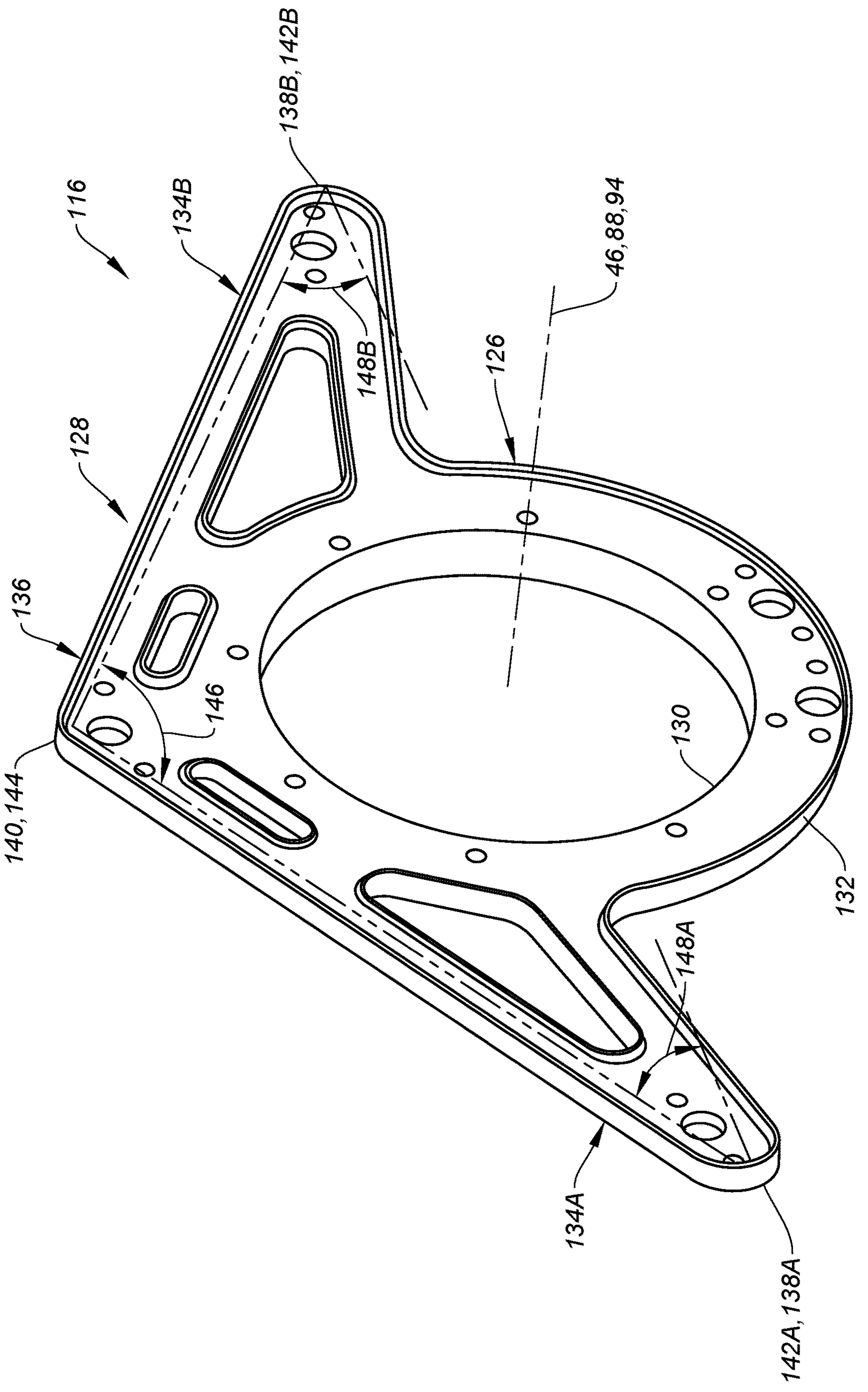
FIG. 9 is a perspective illustration of a machine mount.

Referring to FIG. 9, the machine mount 116 includes a mounting ring 126 and a (e.g., triangular) mounting frame 128 connected to (e.g., formed integral with) the mounting ring 126. The mounting ring 126 extends circumferentially around the longitudinal centerline 94/the axes 46, 88 providing the mounting ring 126 with a full-hoop geometry. The mounting ring 126 extends radially from a radial inner end 130 of the machine mount 116 and its mounting ring 126 to a radial outer end 132 of the mounting ring 126. The mounting frame 128 projects radially out from the mounting ring 126 at its outer end 132. The mounting frame 128 of FIG. 9, for example, includes one or more mounting arms 134A, 134B and 136; e.g., projections, tabs, etc. The central mounting arm 136 is arranged laterally between the side mounting arms 134A and 134B (generally referred to as "134"). Each of these mounting arms projects 134A, 134B, 136 out from the mounting ring 126 to a distal end 138A, 138B, 140 of the respective mounting arm 134A, 134B, 136.

These mounting arm ends 138A, 138B, 140 may be arranged to provide the mounting frame 128 with a substantially triangular shape, where each of the mounting arm ends 138A, 138B, 140 forms a respective peak 142A, 142B, 144 of the triangular shape. An angle 146 between the side mounting arm peaks 142A and 142B (generally referred to as "142") about the central mounting arm peak 144 may be an obtuse angle; e.g., between one-hundred degrees (100°) and one-hundred and forty degrees (140°). An angle 148A between the central mounting arm peak 144 and the second side mounting arm peak 142B about the first side mounting arm peak 142A may be an acute angle; e.g., between fifteen degrees (15°) and forty-five degrees (45°). An angle 148B between the central mounting arm peak 144 and the first side mounting arm peak 142A about the second side mounting arm peak 142B may be an acute angle; e.g., between fifteen degrees (15°) and forty-five degrees (45°). The present disclosure, however, is not limited to such exemplary values.

Referring to FIG. 5, the machine mount 116 and its mounting ring 126 are connected to the electric machine 30 and its machine case 48. The mounting ring 126 of FIG. 5, for example, is seated on a rim of the machine case 48. With this arrangement, the machine mount 116 and its mounting ring 126 extend circumferentially about (e.g., circumscribe) and axially engage (e.g., are abutted against) the electric machine 30 and its machine case 48. The mounting ring 126 is mechanically fastened to the machine case 48 with a plurality of fasteners (e.g., bolts) at a bolted connection (not shown for ease of illustration). The machine mount 116 thereby connects the mounting structure 112 to the electric machine 30 and its machine case 48.

Figure 10:
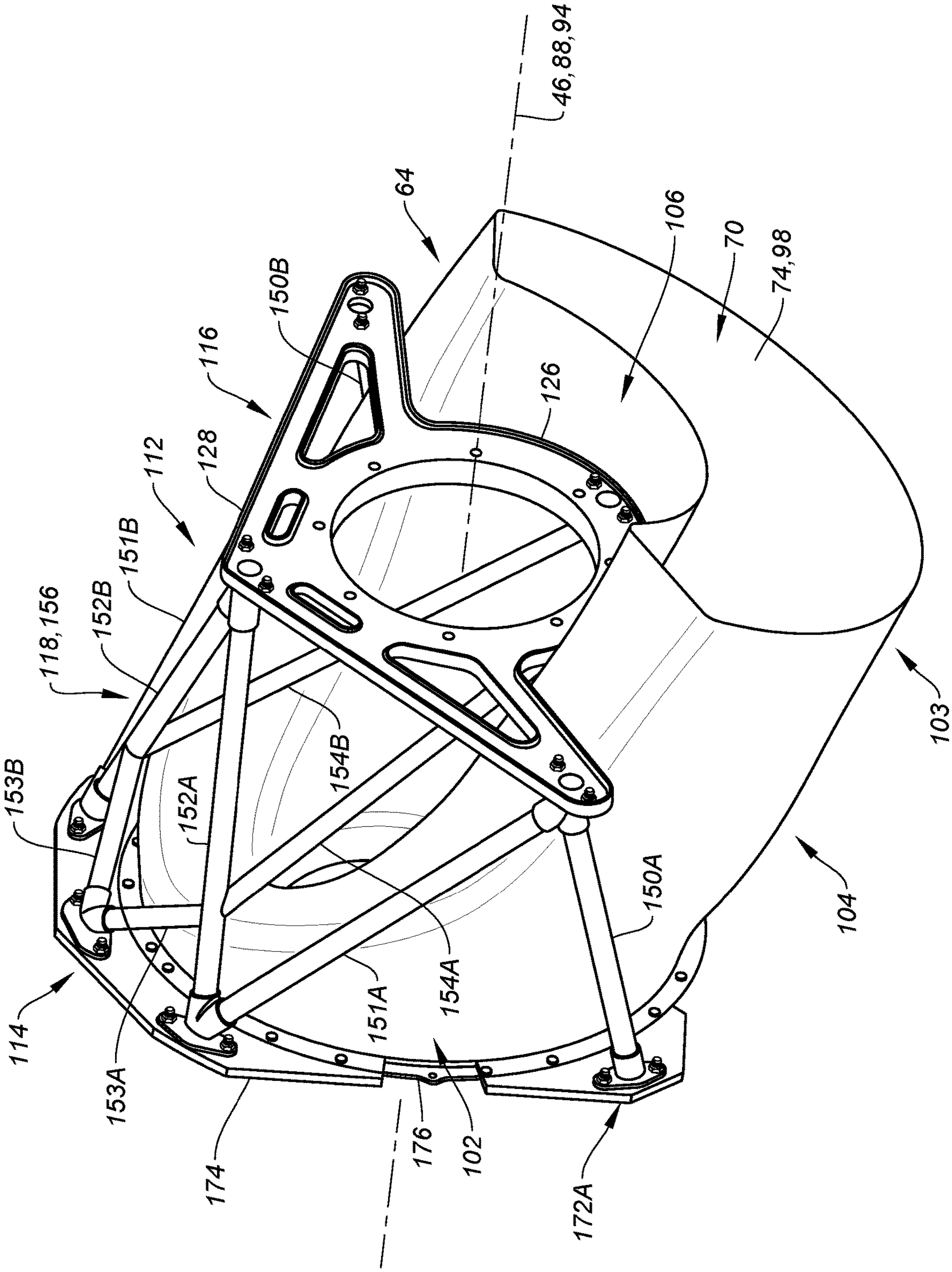
FIG. 10 is a perspective illustration of the exhaust duct and the mounting structure with a segmented duct mount.

Referring to FIGS. 4 and 5, the framework 118 extends axially between and connects the duct mount 114 to the machine mount 116. The framework 118 of FIGS. 4 and 5 (see also FIG. 10) includes a plurality of struts 150A and 150B, 151A and 151B, 152A and 152B, 153A and 153B, 154A and 154B (respectively generally referred to as "150", "151", "152", "153", "154") (e.g., fixed length links, rods, beams, etc.) arranged in a truss 156; e.g., a modified Warren truss. This truss 156 may be laterally symmetric and vertically asymmetric. Therefore, for ease of description, a lateral first side 158A of the truss 156 is described below with the understanding that the other lateral second side 158B of the truss 156 may be a mirror image of the first side 158A of the truss 156.

To the first side 158A of the truss 156 of FIG. 4, each of the mount-to-mount (MM) struts 150A, 151A and 152A extends between and is connected to the duct mount 114 and the machine mount 116. The first MM strut 150A of FIG. 4, for example, is connected to the duct mount 114 at a bottom duct mount node through a fitting 160A, which fitting 160A may be bonded to the first MM strut 150A and mechanically fastened (e.g., bolted) to the duct mount 114. The second MM strut 151A and the third MM strut 152A are connected to the duct mount 114 at a side duct mount node through a fitting 162A, which fitting 162A may be bonded to the second and the third MM struts 151A and 152A and mechanically fastened (e.g., bolted) to the duct mount 114. The first MM strut 150A and the second MM strut 151A are connected to the machine mount 116 and its first side mounting arm 134A at a side machine mount node through a fitting 164A, which fitting 164A may be bonded to the first and the second MM struts 150A and 151A and mechanically fastened (e.g., bolted) to the machine mount 116. The third MM strut 152A from the first side 158A of the truss 156 and the third MM strut 152B from the second side 158B of the truss 156 are connected to the machine mount 116 and its central mounting arm 136 at a central machine mount node through a fitting 166, which fitting 166 may be bonded to the third MM struts 152A and 152B and mechanically fastened (e.g., bolted) to the machine mount 116.

The duct mount-to-strut (DMS) strut 153A extends between and is connected to the duct mount 114 and the third MM strut 152A. The DMS strut 153A from the first side 158A of the truss 156 and the DMS strut 153B from the second side 158B of the truss 156 of FIG. 4, for example, are connected to the duct mount 114 at a central duct mount node through a fitting 168, which fitting 168 may be bonded to the DMS struts 153 and mechanically fastened (e.g., bolted) to the duct mount 114. The DMS strut 153A is connected to the third MM strut 152A at an intermediate strut node disposed along a length of the third MM strut 152A between the nodes at the fittings 162A and 166.

Referring to FIG. 5, the machine mount-to-strut (MMS) strut 154B on the second side 158B extends between and is connected to the machine mount 116 and the third MM strut 152B. The MMS strut 154B of FIG. 5, for example, is connected to the machine mount 116 at a bottom machine mount node through a fitting 170B, which fitting 170B may be bonded to the MMS strut 154B and mechanically fastened (e.g., bolted) to the machine mount 116. This bottom machine mount node may be diametrically opposite the central machine mount node. The MMS strut 154B of FIG. 4 is connected to the third MM strut 152B at the intermediate strut node with the DMS strut 153B.

With the foregoing arrangement, referring to FIG. 4, the mounting ring 126 is disposed in the side pocket 106. Each side mounting arm 134 projects out of the side pocket 106 and radially overlaps a respective circumferential side 110 of the exhaust duct 64. An outer peripheral portion of the truss 156 and its struts 150, 151, 152 and 153 wrap partially circumferentially around the exhaust duct 64 and circumferentially and axially overlaps a portion of the side pocket 106 between the inlet section 102 and the electric machine 30. In addition, an inner portion of the truss 156 and its struts 154 project radially into the side pocket 106; see also FIG. 5. The mounting frame 128 and its truss 156 thereby wrap around each circumferential end 110 of the exhaust duct 64 and its transition section 104.

Figure 11:
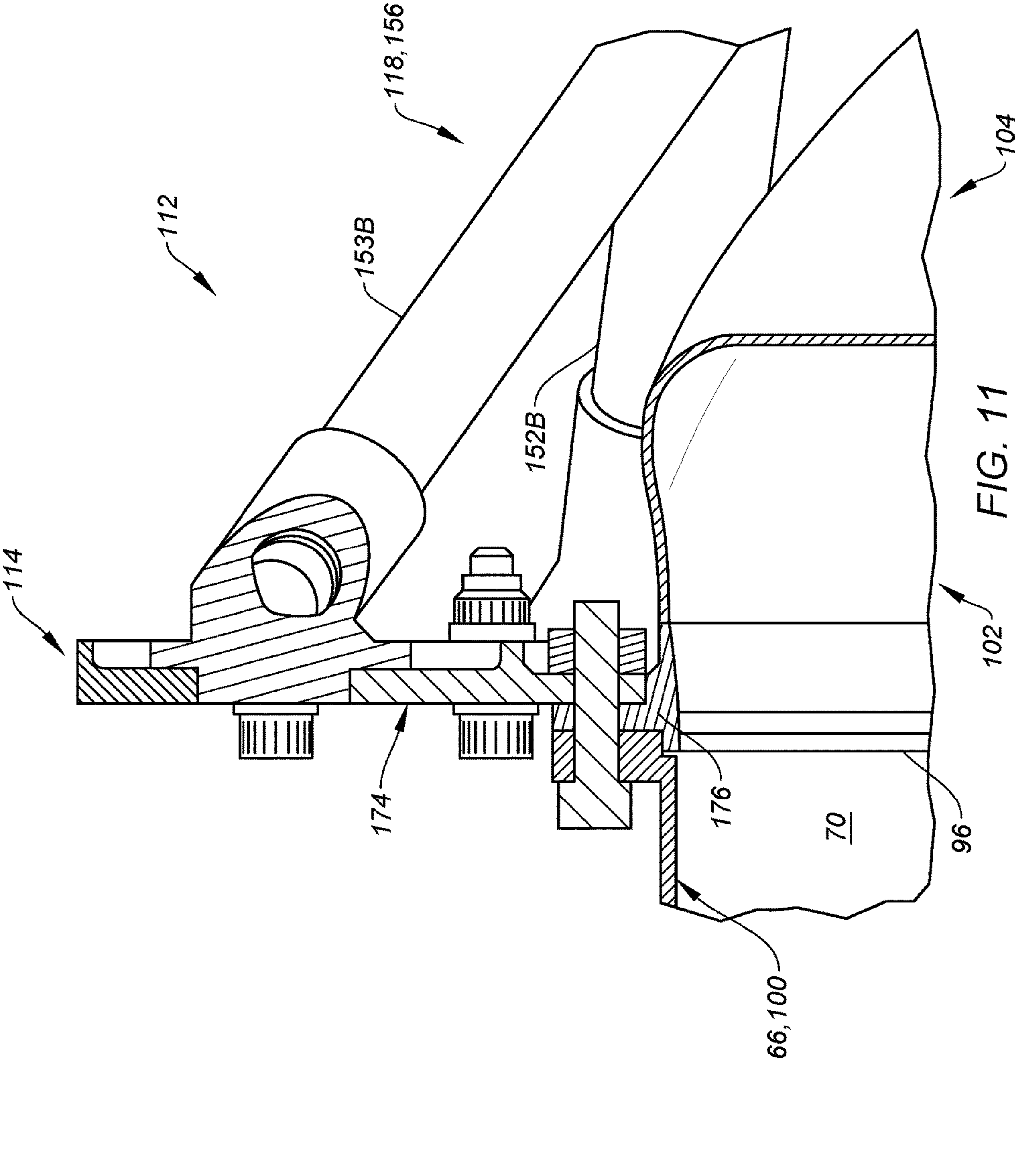
FIG. 11 is a sectional illustration of the bolted connection between the engine case, the exhaust duct and the segmented duct mount.

In some embodiments, referring to FIGS. 4 and 5, the duct mount 114 may be configured as a single monolithic body. In other embodiments, referring to FIG. 10, the duct mount 114 may include a plurality of discrete mounting flanges 172A and 174 (note, a mirror image of flange 172A is not visible in the view of FIG. 10) arranged circumferentially about the longitudinal centerline 94/the axes 46, 88. With such an arrangement, the duct mount 114 may be arranged with (e.g., mounted to) the gas turbine engine 32 following assembly of the exhaust duct 64 to the engine case 66. Referring to FIG. 11, each mounting flange (e.g., 174) may be mechanically fastened to the exhaust duct 64 and the engine case 66 with a plurality of fasteners (e.g., bolts) at a bolted flange connection. Here, the exhaust duct 64 includes a mounting flange 176 arranged between and engaged with (e.g., axially abutted against) the engine case 66 and the duct mount 114.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an electric machine extending axially along an axis;

an exhaust duct including an annular first section and a non-annular second section fluidly coupled with and downstream of the annular first section, the annular first section extending circumferentially around the axis, and the non-annular second section axially overlapping the electric machine and extending partially circumferentially about the electric machine; and a mounting structure connecting the electric machine to the exhaust duct, the mounting structure including a duct mount, a machine mount and a framework;

the duct mount connected to the annular first section;

the machine mount connected to the electric machine; and the framework extending axially between and connected to the duct mount and the machine mount, the framework comprising a plurality of struts arranged in a truss.

2. The assembly of claim 1, wherein the duct mount comprises an annular mounting flange that extends circumferentially around the axis.

3. The assembly of claim 1, wherein the duct mount includes a plurality of mounting flanges arranged circumferentially about the axis.

4. The assembly of claim 1, wherein the exhaust duct is bonded to the duct mount.

5. The assembly of claim 1, wherein the exhaust duct is mechanically fastened to the duct mount.

6. The assembly of claim 1, wherein the machine mount extends circumferentially around and is mechanically fastened to the electric machine.

7. The assembly of claim 1, wherein the machine mount includes a mounting ring connected to the electric machine; and a triangular frame projecting out from the mounting ring and connected to the framework.

8. The assembly of claim 1, wherein the machine mount includes a mounting ring connected to the electric machine;

a first arm projecting out from the mounting ring and connected to a first set of the plurality of struts at a first node; and a second arm projecting out from the mounting ring and connected to a second set of the plurality of struts at a second node.

9. The assembly of claim 8, wherein the exhaust duct extends partially circumferentially about the mounting ring between a first circumferential side and a second circumferential side;

the first arm radially overlaps the first circumferential side, and the first node is disposed radially outboard of the exhaust duct; and the second arm radially overlaps the second circumferential side, and the second node is disposed radially outboard of the exhaust duct.

10. The assembly of claim 8, wherein the machine mount further includes a third arm circumferentially between the first arm and the second arm;

the third arm projects out from the mounting ring and is connected to a third set of the plurality of struts at a third node.

11. The assembly of claim 10, wherein a fourth set of the plurality of struts are connected to the mounting ring at a fourth node that is diametrically opposite the third node.

12. The assembly of claim 8, wherein a third set of the plurality of strut are connected to the mounting ring circumferentially between and equispaced from the first node and the second node.

13. The assembly of claim 1, wherein the plurality of struts include a first strut, a second strut and a third strut;

the first strut and the second strut are connected to the duct mount at a first duct mount node;

the second strut and the third strut are connected to the machine mount at a first machine mount node; and the third strut is connected to the duct mount at a second duct mount node.

14. The assembly of claim 13, wherein the plurality of struts further include a fourth strut;

the fourth strut is connected to the second strut at a location between the first duct mount node and the second duct mount node; and the fourth strut is connected to the machine mount at a second machine mount node.

15. The assembly of claim 13, wherein the plurality of struts further include a fourth strut;

the fourth strut is connected to the second strut at a location between the first duct mount node and the second duct mount node; and the fourth strut is connected to the duct mount at a third duct mount node.

16. The assembly of claim 1, wherein the annular first section is axially spaced from the electric machine.

17. The assembly of claim 1, further comprising:

a gas turbine engine comprising the exhaust duct, an engine case and a rotating assembly, the engine case housing the rotating assembly, the electric machine mounted to the engine case through the mounting structure; and a drivetrain projecting through a bore of the annular first section and operably coupling a rotor in the electric machine to the rotating assembly.

18. An assembly for an aircraft propulsion system, comprising:

an electric machine extending axially along an axis;

an exhaust duct including an annular first section and a non-annular second section fluidly coupled with and downstream of the annular first section, the annular first section circumscribing the axis, and the non-annular second section axially overlapping the electric machine and wrapping partially circumferentially about the electric machine; and a mounting structure connecting the electric machine to the exhaust duct, the mounting structure including a plurality of struts arranged in a truss, an outer portion of the truss wrapping partially circumferentially about the annular first section, and an inner portion of the truss projecting radially into a pocket in the non-annular second section towards the electric machine.

* * * * *